United States Patent
Itoh et al.

(10) Patent No.: US 12,170,053 B2
(45) Date of Patent: Dec. 17, 2024

(54) IMAGE PROCESSING APPARATUS THAT CORRECTS LUMINANCE VALUES IN PIXELS IN A SPECIFIED DISPLAY REGION USING A CORRECTION AMOUNT BASED ON VECTORS BETWEEN A PIXEL AND AN IMAGE CAPTURE APPARATUS

(71) Applicant: CANON KABUSHIKI KAISHA, Tokyo (JP)

(72) Inventors: Yasuhiro Itoh, Kanagawa (JP); Takahiro Matsuura, Tokyo (JP); Yoshiki Ishii, Kanagawa (JP); Keisuke Matsuno, Kanagawa (JP); Takehito Fukushima, Tokyo (JP); Masaharu Yamagishi, Kanagawa (JP); Kento Watanabe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/356,076

(22) Filed: Jul. 20, 2023

(65) Prior Publication Data
US 2024/0038149 A1    Feb. 1, 2024

(30) Foreign Application Priority Data
Jul. 26, 2022   (JP) .................................. 2022-118872

(51) Int. Cl.
*G09G 3/32*     (2016.01)
*G06V 10/25*    (2022.01)
*G06V 10/60*    (2022.01)

(52) U.S. Cl.
CPC ............. *G09G 3/32* (2013.01); *G06V 10/25* (2022.01); *G06V 10/60* (2022.01); *G09G 2320/0233* (2013.01); *G09G 2320/0626* (2013.01)

(58) Field of Classification Search
CPC .......... G09G 3/30; G09G 3/32; G09G 3/3208; G09G 3/3216; G09G 3/3225;
(Continued)

(56) References Cited

U.S. PATENT DOCUMENTS

| 9,357,209 B2 * | 5/2016 | Kim | .................. | H04N 21/4318 |
| 2004/0246274 A1 * | 12/2004 | Rykowski | ................ | G09G 5/10 345/690 |

(Continued)

FOREIGN PATENT DOCUMENTS

| JP | 2009128381 A | 6/2009 |
| JP | 2012042804 A | 3/2012 |

*Primary Examiner* — Ke Xiao
*Assistant Examiner* — Nelson Lam
(74) *Attorney, Agent, or Firm* — Canon U.S.A., Inc., IP Division

(57) ABSTRACT

An image processing apparatus comprises one or more processors and one or more memories containing instructions that, when executed by the one or more processors, cause the one or more processors to function as a specification unit configured to, based on a parameter of an image capturing unit, specify a region captured by the image capturing unit in a display screen in which display panels are arrayed, and a correction unit configured to, based on a direction from a pixel in the region to the image capturing unit, obtain a correction amount of a luminance value of the pixel, and based on information for correcting an individual difference regarding a luminance of a display panel, correct the correction amount.

8 Claims, 11 Drawing Sheets

(58) Field of Classification Search
CPC .... G09G 3/3233; G09G 3/3241; G09G 3/325; G09G 3/3258; G09G 3/3266; G09G 3/3275; G09G 3/3283; G09G 3/3291; G09G 2320/0233; G09G 2320/062; G09G 2320/0626
USPC .................................................... 345/76–83
See application file for complete search history.

(56) References Cited

U.S. PATENT DOCUMENTS

| | | | | |
|---|---|---|---|---|
| 2006/0274022 | A1* | 12/2006 | Ohashi | G02F 1/1309 345/102 |
| 2007/0236438 | A1* | 10/2007 | Sung | G09G 3/3648 345/88 |
| 2008/0170004 | A1* | 7/2008 | Jung | G09G 3/3233 345/76 |
| 2010/0149077 | A1* | 6/2010 | Asano | H10K 59/13 345/76 |
| 2011/0267365 | A1* | 11/2011 | Kostal | G06F 3/1446 348/129 |
| 2012/0062621 | A1* | 3/2012 | Miyahara | G09G 5/10 345/690 |
| 2014/0300756 | A1* | 10/2014 | Murase | H04N 9/3194 348/189 |
| 2018/0040271 | A1* | 2/2018 | Jung | G06F 3/1446 |
| 2019/0213941 | A1* | 7/2019 | Beon | G09G 3/2003 |

\* cited by examiner

FIG. 8

| ANGLE | R ELEMENT CORRECTION AMOUNT | G ELEMENT CORRECTION AMOUNT | B ELEMENT CORRECTION AMOUNT |
|---|---|---|---|
| -80 | 1.41 | 1.40 | 1.54 |
| -60 | 1.24 | 1.24 | 1.35 |
| -45 | 1.12 | 1.11 | 1.19 |
| -30 | 1.05 | 1.04 | 1.10 |
| 0 | 1.00 | 1.00 | 1.00 |
| 30 | 1.05 | 1.07 | 1.05 |
| 45 | 1.11 | 1.16 | 1.12 |
| 60 | 1.22 | 1.30 | 1.27 |
| 80 | 1.40 | 1.45 | 1.43 |

FIG. 9

| PANEL POSITION | CORRECTION AMOUNT R | CORRECTION AMOUNT G | CORRECTION AMOUNT B |
|---|---|---|---|
| (1,1) | 1.01 | 1.02 | 1.01 |
| (1,2) | 0.99 | 1.00 | 1.02 |

IMAGE PROCESSING APPARATUS THAT CORRECTS LUMINANCE VALUES IN PIXELS IN A SPECIFIED DISPLAY REGION USING A CORRECTION AMOUNT BASED ON VECTORS BETWEEN A PIXEL AND AN IMAGE CAPTURE APPARATUS

BACKGROUND

Technical Field

One disclosed aspect of the embodiments relates to a luminance control technique in a display panel.

Description of the Related Art

Conventionally, techniques for correcting video of a display monitor in accordance with a position of an observer have been known (Japanese Patent Laid-Open No. 2012-42804 and Japanese Patent Laid-Open No. 2009-128381). The techniques described in Japanese Patent Laid-Open No. 2012-42804 and Japanese Patent Laid-Open No. 2009-128381 obtain the position of the observer by using an image capturing apparatus such as a camera, and correct the video of the display monitor based on the obtained position information.

In recent years, in the field of video production, a method (virtual production) in which a video is displayed on a display apparatus comprising a plurality of Light Emitting Diode (LED) panels, such as an LED wall, and the video is captured by a camera has become popular. In virtual production, motion and line of sight of the camera are measured in real time, and video displayed on a LED wall part included in an angle of view of the camera is changed in real time. By capturing the LED wall with the camera, video in which it appears as though a real object is present is captured.

It has been found that display elements (LED elements) constituting pixels of LED walls, which are often used in virtual production, have a variable-angle reflecting property, and when viewed from an oblique direction, the luminance of an LED element is less than when viewed straight on. Further, the display monitors that are corrected in the prior art are display apparatuses comprising a single LED panel, whereas an LED wall comprises a plurality of the LED panels. Therefore, when a single correction coefficient is defined for all of a plurality of LED panels, there is a problem that variations in brightness of the respective panels cannot be controlled thereby.

SUMMARY

The present disclosure provides a technique for obtaining correction amounts that enable luminance control in an LED wall, which is an array of LED panels, so as to enable capturing of display information at similar brightnesses irrespective of what direction the LED wall is captured from.

According to the first aspect of the embodiments an image processing apparatus includes one or more processors and one or more memories containing instructions that, when executed by the one or more processors, cause the one or more processors to function as a specification unit and a correction unit. The specification unit is configured to, based on a parameter of an image capturing unit, specify a region captured by the image capturing unit in a display screen in which display panels are arrayed. The correction unit is configured to, based on a direction from a pixel in the region to the image capturing unit, obtain a correction amount of a luminance value of the pixel, and based on information for correcting an individual difference regarding a luminance of a display panel, correct the correction amount.

According to the second aspect of the embodiments, a system includes an image capturing apparatus, an image processing apparatus, and a display apparatus configured to provide a display screen in which display panels are arrayed. The image processing apparatus includes one or more processors and one or more memories containing instructions that, when executed by the one or more processors, cause the one or more processors to function as a specification unit, a correction unit, and an output unit. The specification unit is configured to, based on a parameter of the image capturing apparatus, specify a region captured by the image capturing apparatus in the display screen. The correction unit is configured to, based on a direction from a pixel in the region to the image capturing apparatus, obtain a correction amount of a luminance value of the pixel, and based on information for correcting an individual difference regarding a luminance of a display panel, correct the correction amount. The output unit is configured to output to the display apparatus a correction amount corrected by the correction unit. The display apparatus includes a control unit configured to correct a luminance value of each pixel in the region in accordance with the correction amount corrected by the correction unit to display on the display screen.

According to the third aspect of the embodiments, an image processing method includes based on a parameter of an image capturing unit, specifying a region captured by the image capturing unit in a display screen in which display panels are arrayed; and based on a direction from a pixel in the region to the image capturing unit, obtaining a correction amount of a luminance value of the pixel, and based on information for correcting an individual difference regarding a luminance of a display panel, correcting the correction amount.

According to the fourth aspect of the embodiments, a non-transitory computer-readable storage medium stores a computer program for causing a computer to function as a specification unit and a correction unit. The specification unit is configured to, based on a parameter of an image capturing unit, specify a region captured by the image capturing unit in a display screen in which display panels are arrayed. The correction unit is configured to, based on a direction from a pixel in the region to the image capturing unit, obtain a correction amount of a luminance value of the pixel, and based on information for correcting an individual difference regarding a luminance of a display panel, correct the correction amount.

Further features of the disclosure will become apparent from the following description of exemplary embodiments with reference to the attached drawings.

BRIEF DESCRIPTION OF THE DRAWINGS

FIG. 8 is a diagram illustrating a configuration example of a table.

FIG. 9 is a diagram illustrating an example of individual difference information.

DESCRIPTION OF THE EMBODIMENTS

Figure 1:
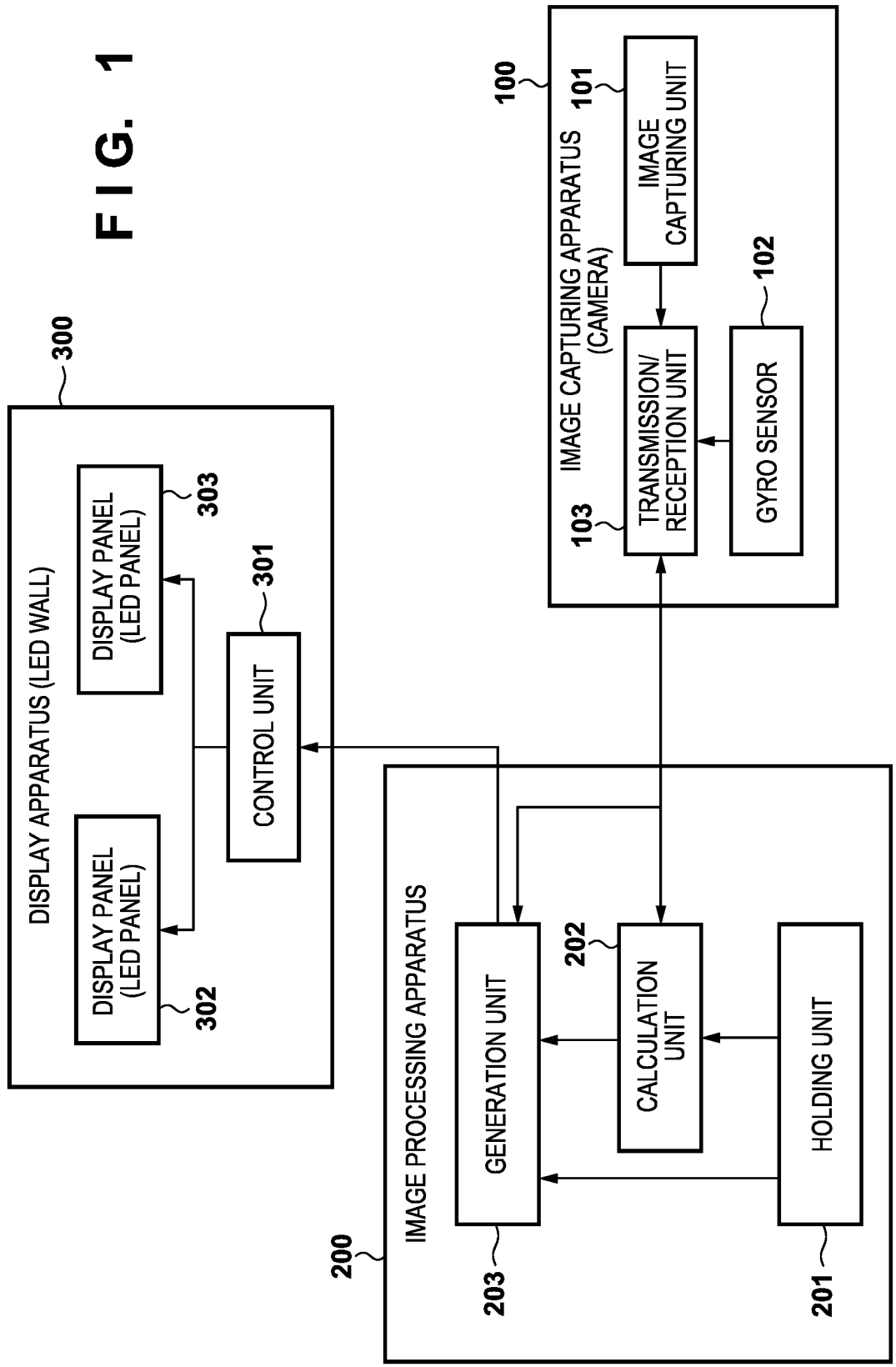
FIG. 1 is a block diagram illustrating a configuration example of a system.

Hereinafter, embodiments will be described in detail with reference to the attached drawings. Note, the following embodiments are not intended to limit the scope of the disclosure. Multiple features are described in the embodiments, but limitation is not made to a disclosure that requires all such features, and multiple such features may be combined as appropriate. Furthermore, in the attached drawings, the same reference numerals are given to the same or similar configurations, and redundant description thereof is omitted.

In the following, the term "unit" may have different meanings depending on the context. The usual meaning is an individual element, single and complete. The phrase "units of" may refer to a plurality of elements or a group of elements. In addition, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or program that, when executed by the CPU, cause the CPU to perform operations corresponding to units or functions. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials. Furthermore, depending on the context, the term "portion," "part," "device," "switch," or similar terms may refer to a circuit or a group of circuits. The circuit or group of circuits may include electronic, mechanical, or optical elements such as capacitors, diodes, transistors. For example, a switch is a circuit that turns on and turns off a connection. It can be implemented by a transistor circuit or similar electronic devices.

First Embodiment

First, a configuration example of a system according to the present embodiment will be described with reference to a block diagram of FIG. 1. As illustrated in FIG. 1, the system according to the present embodiment includes a display apparatus 300 that provides a display screen that is an array of display panels (an array of display elements), an image capturing apparatus 100 that captures a part or all of the display screen, and an image processing apparatus 200 that obtains correction amounts for luminance of pixels in the display screen and outputs the correction amounts to the display apparatus 300 together with display information. Configuration is such that data communication between the image processing apparatus 200 and the display apparatus 300 and between the image processing apparatus 200 and the image capturing apparatus 100 is possible via a wired network, a wireless network, a network that combines wired and wireless, and the like.

First, the display apparatus 300 will be described. The display apparatus 300 includes a display panel 302 and a display panel 303 which are capable of displaying display information such as images and characters. In the present embodiment, the display panel 302 and the display panel 303 are arranged side by side (adjacent to each other) to provide a display screen which is an array of the display panel 302 and the display panel 303. In the present embodiment, the display panel 302 and the display panel 303 are LED panels (arrays of LED elements (pixels)), and the display apparatus 300 (a display screen which is an array of the display panel 302 and the display panel 303) forms an LED wall. In FIG. 1, for simplicity of explanation, the number of display panels included in the display apparatus 300 (that is, the number of display panels constituting the LED wall) is set to 2, but any number may be used as long as it is 2 or more.

The display apparatus 300 includes a control unit 301. The control unit 301 controls various operations of the display apparatus 300. For example, the control unit 301 divides display information transmitted from the image processing apparatus 200 into first display information to be displayed on the display panel 302 and second display information to be displayed on the display panel 303. In the present embodiment, the display information transmitted from the image processing apparatus 200 is divided into a left half and a right half, and the left half is set as the first display information and the right half is set as the second display information. Then, the control unit 301 causes the display panel 302 to display the first display information, and causes the display panel 303 to display the second display information.

For example, it is assumed that display information, which is A pixels in the vertical and B pixels in the horizontal, can be displayed on the LED wall as a whole. Here, the upper-left corner coordinates of the LED wall are denoted by (0, 0). The display panel 302 is responsible for the display of a region whose upper-left corner coordinates in the display information are (0, 0) and whose bottom-right corner coordinates are (B/2−1, A−1), and the display panel 303 is responsible for the display of a region whose upper-left corner coordinates in the display information are (B/2, 0) and whose bottom-right corner coordinates are (B−1, A−1). As described above, when the arrangement of the display panels is determined, which display panel is in charge of the display of which region in the display information that can be displayed on the entire LED wall is determined.

The control unit 301 causes the LED elements (pixels) at designated positions on the display panel 302 and the display panel 303 to emit light based on the display information transmitted from the image processing apparatus 200, thereby causing the display information to be displayed.

Next, the image capturing apparatus 100 will be described. The image capturing apparatus 100 is a camera or an image sensor that captures a part or all of the LED wall. The image capturing apparatus 100 may be a camera that captures a moving image, or may be a camera that captures still images periodically or irregularly. Note that the image capturing apparatus 100 may be a device (a tablet terminal apparatus with a camera, a smartphone, or the like) equipped with such a camera.

The image capturing unit 101 includes a lens, a drive control unit that controls driving of the lens, an image sensor that photoelectrically converts light entering from the outside world through the lens and converts the light into an image signal, and an image processing circuit that generates a captured image by performing various types of image processing based on the image signal.

A gyro sensor 102 measures its position and posture as the position of the image capturing apparatus 100 and the posture of the image capturing apparatus 100, respectively, and outputs position information indicating the position of the image capturing apparatus 100 and posture information indicating the posture of the image capturing apparatus 100.

The transmission/reception unit 103 performs data communication with the image processing apparatus 200. The transmission/reception unit 103 transmits the position information and the posture information outputted from the gyro sensor 102, the captured image generated by the image capturing unit 101, and "focal length information indicating the focal length of the image capturing apparatus 100" and "sensor size information indicating the vertical/horizontal size of the image sensor" held in the image capturing unit 101 to the image processing apparatus 200 as image capture information.

Note that the image capturing apparatus 100 may further include a recording unit that records, for example, the captured image generated by the image capturing unit 101 and information regarding the captured image in a memory included therein or a memory card detachably attached to the image capturing apparatus 100.

Figure 3:
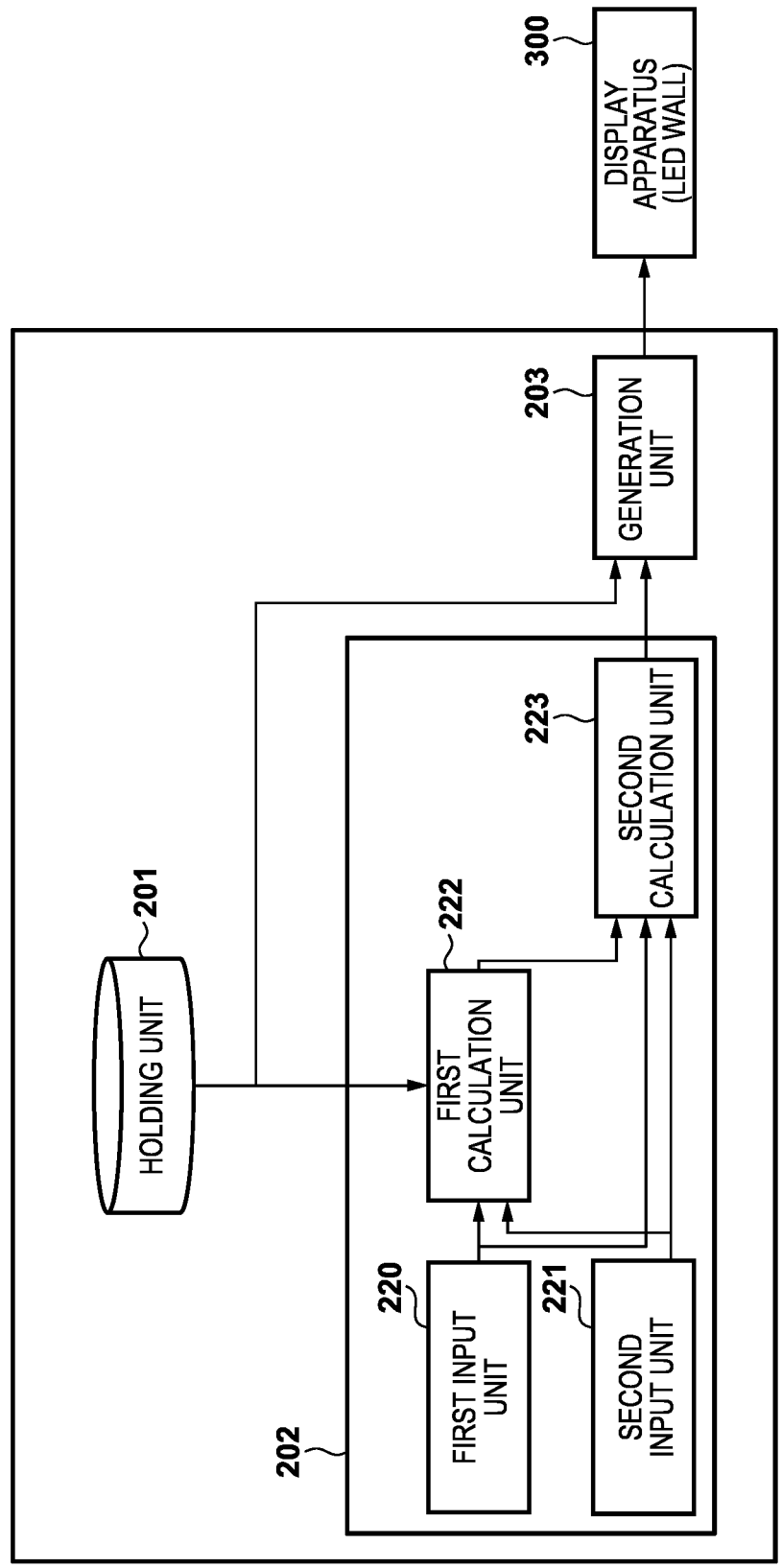
FIG. 3 is a block diagram illustrating a more detailed functional configuration example of the image processing apparatus 200.

Next, the image processing apparatus 200 will be described. The image processing apparatus 200 is a computer apparatus such as a PC (personal computer), a tablet terminal apparatus, or a smart phone, and executes various processing by communicating with the image capturing apparatus 100 and the display apparatus 300. The image processing apparatus 200 specifies a captured region captured by the image capturing apparatus 100 in the LED wall based on parameters of the image capturing apparatus 100. Then, the image processing apparatus 200 obtains a correction amount for the luminance of LED elements (pixels) in the captured region based on the angle from the LED element (pixel) to the image capturing apparatus 100, and corrects the correction amount based on information for correcting an individual difference regarding luminance of the display panels. Then, the image processing apparatus 200 outputs the corrected correction amounts to the display apparatus 300 together with the display information. The display apparatus 300 causes the LED elements (pixels) to emit light with luminance values obtained by correcting luminance values according to the display information outputted from the image processing apparatus 200, in accordance with the correction amounts for the LED elements (pixels). FIG. 3 is a block diagram illustrating a more detailed functional configuration example of the image processing apparatus 200.

Figure 4:
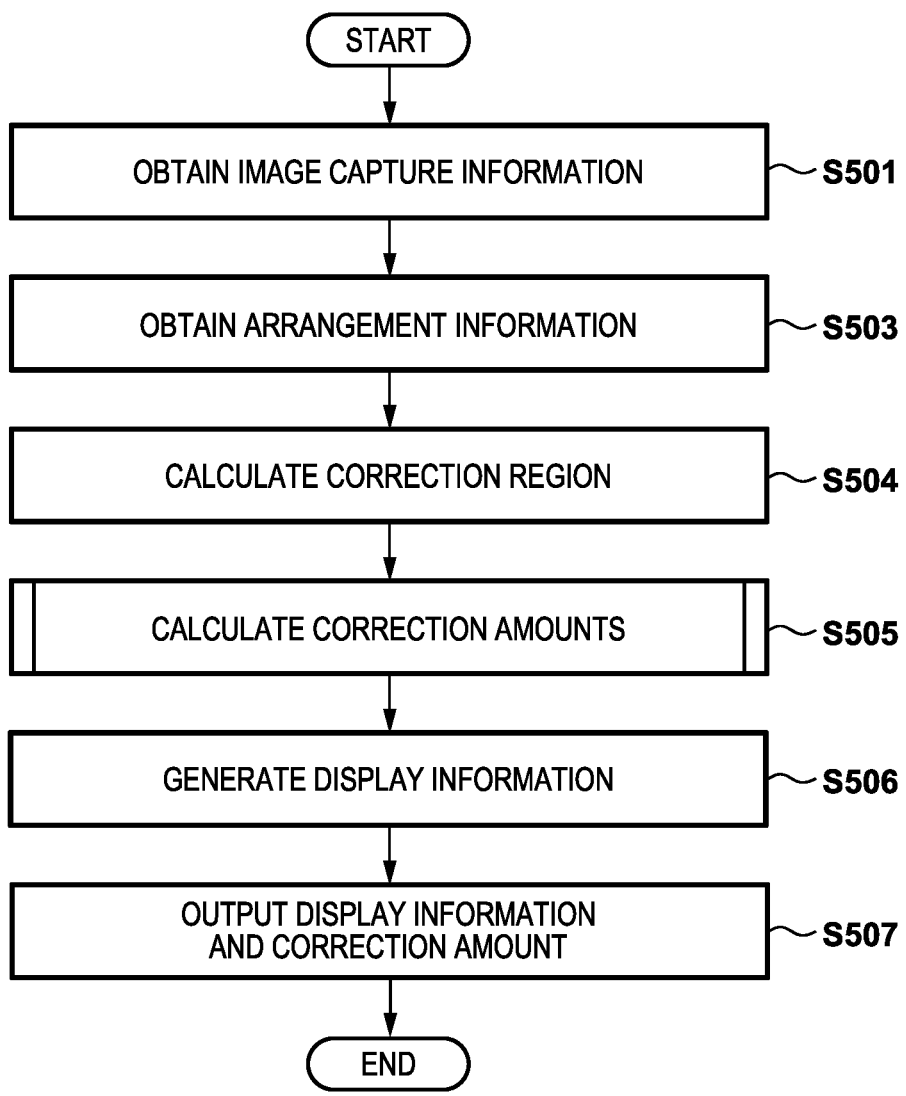
FIG. 4 is a flowchart of a process performed by the image processing apparatus 200 to display display information on an LED wall.

Next, a description will be given in accordance with the flowchart of FIG. 4 in regards to a process performed by the image processing apparatus 200 to display display information on an LED wall. In step S501, a calculation unit 202 receives (obtains) image capture information transmitted from the image capturing apparatus 100. More specifically, a first input unit 220 included in the calculation unit 202 obtains position information and posture information transmitted from the image capturing apparatus 100, and a second input unit 221 included in the calculation unit 202 obtains focal length information and sensor size information transmitted from the image capturing apparatus 100.

In step S503, the first calculation unit 222 included in the calculation unit 202 obtains the arrangement information stored in a holding unit 201. The arrangement information is information indicating "the respective positions of the display panel 302 and the display panel 303" in the same coordinate system (hereinafter referred to as a shared coordinate system) as that of the position and the posture measured by the gyro sensor 102. The positions of the LED elements in each of the display panel 302 and the display panel 303 are known. Therefore, the positions of "the LED elements in each of the display panel 302 and the display panel 303" in the shared coordinate system are obtained from the arrangement information and the positions of the LED elements in each of the display panel 302 and the display panel 303. Note that the arrangement information may be information indicating the positions of "the LED elements in each of the display panel 302 and the display panel 303" in the shared coordinate system. Therefore, the "normal vector of the LED wall" in the shared coordinate system is obtained from the arrangement information and the positions of the LED elements in each of the display panel 302 and the display panel 303. Note that the arrangement information may be information including the "normal vector of the LED wall" in the shared coordinate system.

In the following description, it is assumed that the positions of "the LED elements in each of the display panel 302 and the display panel 303" in the shared coordinate system and the "normal vector of the LED wall" in the shared coordinate system are known based on the arrangement information.

In step S504, the first calculation unit 222 uses the image capture information obtained in step S501 and the arrangement information obtained in step S503 to obtain a region included in an angle of view range of the image capturing apparatus 100 in the LED wall as a correction region. That is, the correction region is a captured region that is captured by the image capturing apparatus 100 on the LED wall.

Figure 5:
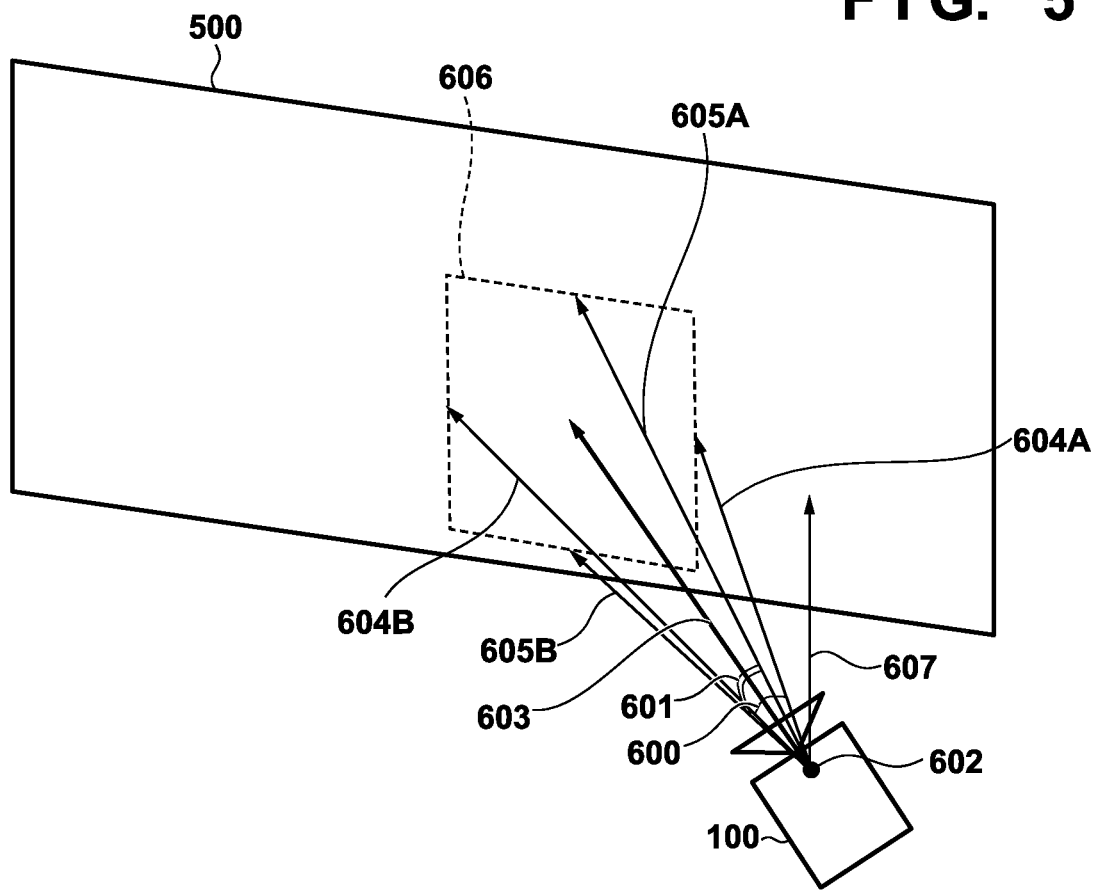
FIG. 5 is a diagram illustrating an example of a method for obtaining a correction region.

Various methods can be applied as the method for obtaining the correction region, and in the present embodiment, the correction region may be obtained using any method. An example of a method for obtaining a correction region will be described below with reference to FIG. 5.

First, the first calculation unit 222 obtains the horizontal angle of view and the vertical angle of view of the image capturing apparatus 100 by a well-known calculation based on the focal length information and the sensor size information. Next, the first calculation unit 222 obtains a vector 603 in the line-of-sight direction indicated by the posture information from a position 602 of the image capturing apparatus 100 indicated by the position information. A vector 607 is a vector indicating a directly up direction in a local coordinate system based on the posture of the image capturing apparatus 100 indicated by the posture information. The first calculation unit 222 next obtains a vector 604A from the position 602 toward "one end of the horizontal angle of view of the image capturing apparatus 100 in the local coordinate system having the vector 603 as the line-of-sight direction and the vector 607 as the directly up direction". Also, the first calculation unit 222 obtains a vector 604B from the position 602 toward "the other end of the horizontal angle of view of the image capturing apparatus 100 in the local coordinate system having the vector 603 as the line-of-sight direction and the vector 607 as the directly up direction". Then, the first calculation unit 222 obtains a vector 605A from the position 602 toward "one end of the vertical angle of view of the image capturing apparatus 100 in the local coordinate system having the vector 603 as the line-of-sight direction and the vector 607 as the directly up direction". Also, the first calculation unit 222 obtains a vector 605B from the position 602 toward the direction of "the other end of the vertical angle of view of the image capturing apparatus 100 in the local coordinate system having the vector 603 as the line-of-sight direction and the vector 607 as the directly up direction".

Also, since the vertical direction and the horizontal direction of the LED wall 500 in the shared coordinate system can be obtained from the positions of "the LED elements in each of the display panel 302 and the display panel 303" in the shared coordinate system, the first calculation unit 222 obtains an angle θA formed by that vertical direction and the vector 607. The angle θA indicates the roll angle of the image capturing apparatus 100 with respect to the line-of-sight direction. The first calculation unit 222 obtains an intersection position U with the vector 605A in the LED wall 500, an intersection position D with the vector 605B in the LED wall 500, an intersection position R with the vector 604A in the LED wall 500, and an intersection position L with the vector 604B in the LED wall 500. Then, the first calculation unit 222 specifies a rectangular region 606 (a rectangle indicated by a dashed line in FIG. 5) surrounded by a straight line obtained by rotating a horizontal straight line passing through the intersection position U by θA, a straight line obtained by rotating a horizontal straight line passing through the intersection position D by θA, a straight line obtained by rotating a vertical straight line passing through the intersection position R by θA, and a straight line obtained by rotating a vertical straight line passing through the intersection position L by θA, as a correction region. It should be noted that the correction region may be made to be a region that encompasses the region 606 specified by the above-described method so as to be able to cope with a sudden movement of the image capturing apparatus 100.

In step S505, the second calculation unit 223 of the calculation unit 202 obtains correction amounts for correcting the luminance value of respective LED elements (pixels) in the correction region obtained in step S504. The LED elements include an R (red) element, a G (green) element, and a B (blue) element, and in step S505, the second calculation unit 223 obtains a correction amount for correcting the luminance value of the R element, a correction amount for correcting the luminance value of the G element, and a correction amount for correcting the luminance value of the B element. Details of the process in step S505 will be described later.

In step S506, the generation unit 203 of the calculation unit 202 generates display information to be displayed on the LED wall based on image/character data stored in the holding unit 201. The display information includes information to be displayed in the correction region and information to be displayed outside the correction region. In step S507, the generation unit 203 outputs the display information generated in step S506 and the correction amounts obtained in step S505 to the display apparatus 300.

Figure 6:
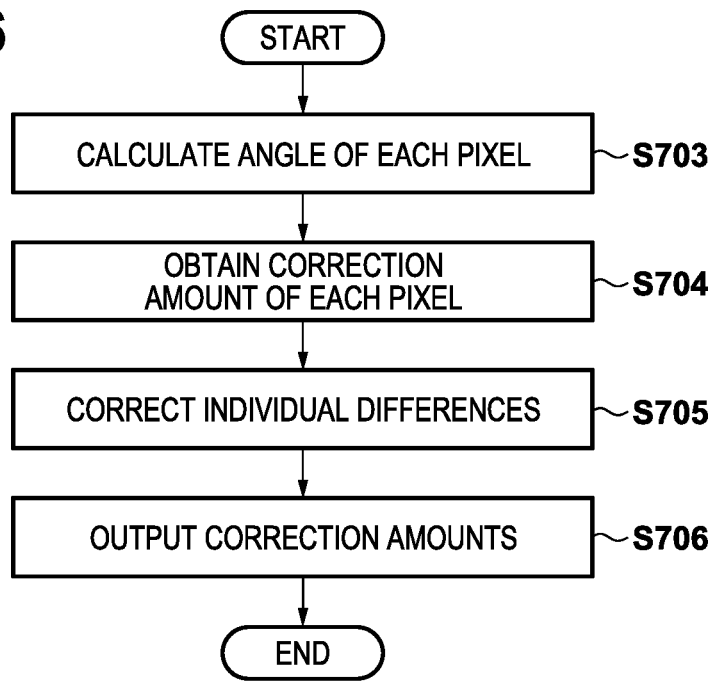
FIG. 6 is a flowchart illustrating details of processing in step S505.
Figure 7:
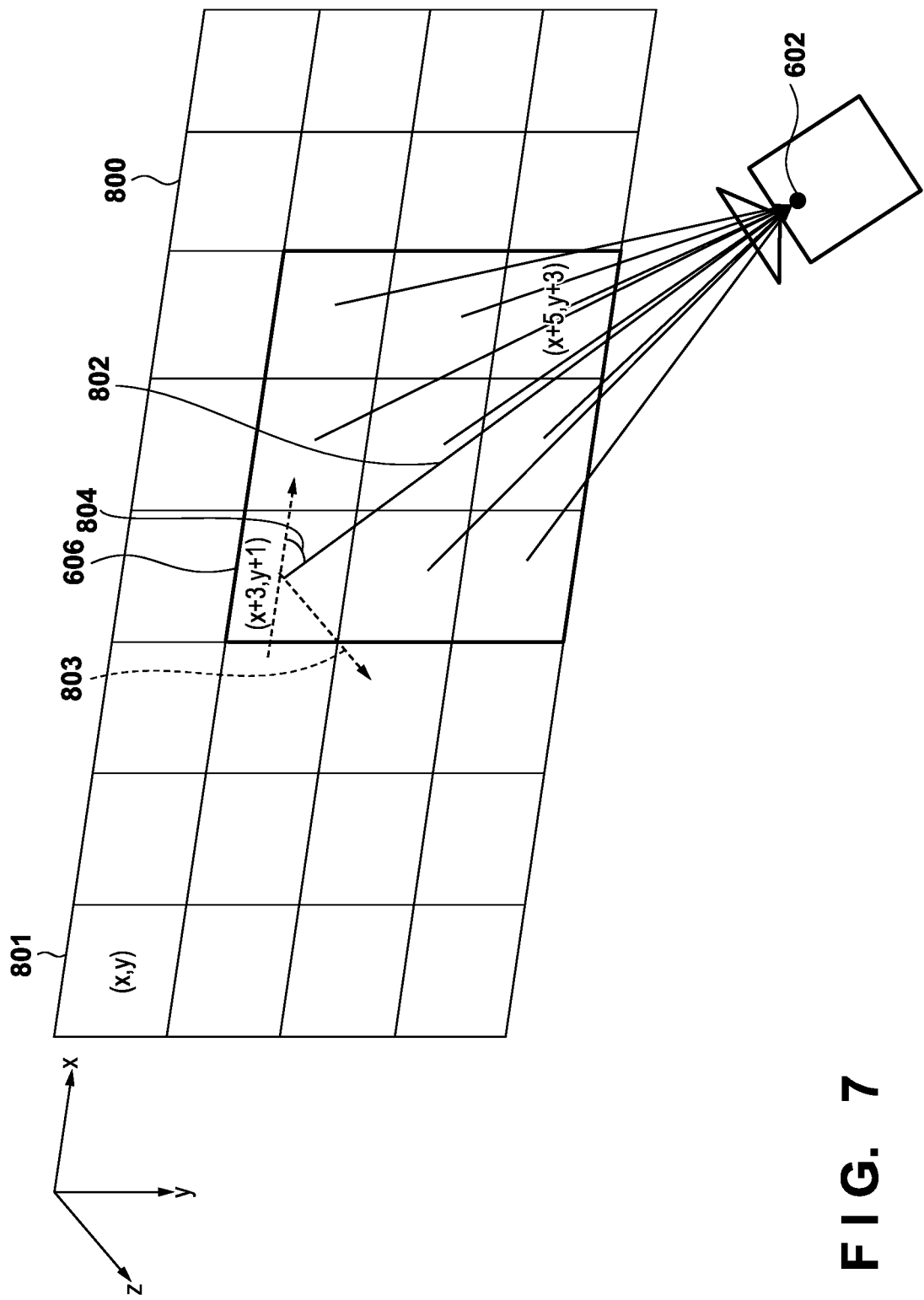
FIG. 7 is a diagram for explaining processing in step S703.

Next, a detailed process in the above-described step S505 will be described in accordance with the flowchart of FIG. 6. In step S703, the second calculation unit 223 obtains an angle from the position of each LED element (pixel) in the correction region toward the position of the image capturing apparatus 100 indicated by the position information. The process in step S703 will be described with reference to FIG. 7. In FIG. 7, a region 800 is a region of a part of the LED wall, and is a region including the region 606 which is the correction region. Each rectangle in the region 800 represents an LED element (pixel), and the coordinates of a rectangle 801 in the upper-left corner of the region 800 are (x, y). At this time, the coordinates of the rectangle at the upper-left corner of the region 606 are (x+3, y+1), and the coordinates of the rectangle at the bottom-right corner are (x+5, y+3).

Here, when the angle corresponding to the LED element (pixel) at the coordinates (x+3, y+1) is obtained, the second calculation unit 223 obtains the angle formed by a normal vector 803 of the LED wall and a vector 802 from the coordinates (x+3, y+1) toward the position 602 as the angle corresponding to the LED element (pixel) at the coordinates (x+3, y+1). The second calculation unit 223 can obtain the angle corresponding to each of the LED elements (pixels) included in the region 606 by performing such a process on each of the LED elements (pixels).

It should be noted that the angle corresponding to the LED element (pixel) at the coordinates (x+3, y+1) is represented by two components. Hereinafter, as illustrated in FIG. 7, the horizontal direction of the LED wall is defined as the x-axis direction, the vertical direction of the LED wall is defined as the y-axis direction, and the direction of the normal vector 803 of the LED wall (each LED element) is defined as the z-axis direction. Here, it is assumed that the normal vector 803 (unit vector)=($a_1$, $a_2$, $a_3$) and the vector 802 (unit vector)=($b_1$, $b_2$, $b_3$). The second calculation unit 223 can calculate angle ($\theta_{XZ}$, $\theta_{XY}$) corresponding to the LED element (pixel) at the coordinates (x+3, y+1) by calculating the following Equation (1) and Equation (2).

$$\theta_{XZ} = \frac{180}{\pi}\cos^{-1}\left(\frac{a_1 b_1 + a_3 a_3}{\sqrt{a_1^2 b_1^2}\sqrt{a_3^2 + b_3^2}}\right) \quad (1)$$

$$\theta_{XY} = \frac{180}{\pi}\cos^{-1}\left(\frac{a_1 b_1 + a_2 a_2}{\sqrt{a_1^2 b_1^2}\sqrt{a_2^2 + b_2^2}}\right) \quad (2)$$

In step S704, the second calculation unit 223 obtains the "luminance value correction amount" corresponding to the angle obtained in step S703 for each pixel in the correction region. Here, the table illustrated in FIG. 8 is registered in advance in the holding unit 201.

In the table of FIG. 8, as the correction amount of the luminance value of the LED element (pixel) corresponding to each angle of −80 degrees, −60 degrees, −45 degrees, −30 degrees, 0 degrees, 30 degrees, 45 degrees, 60 degrees, and 80 degrees, a correction amount of the luminance value of R (red) (R element correction amount), a correction amount of the luminance value of G (green) (G element correction amount), and a correction amount of the luminance value of B (blue) (B element correction amount) are registered. This table indicates correction amounts corresponding to angles which are the degree to which the image capturing apparatus 100 is obliquely capturing an image of an LED element from the left or right of the LED element and which are denoted by a signed angle, where the angle to the image capturing apparatus 100 when it is straight-on facing the LED element is set to 0 degrees. In FIG. 8, an angle from an LED element to the image capturing apparatus 100 when it is on the left side is represented by a negative angle, and an angle from an LED element to the image capturing apparatus 100 when it is on the right side is represented by a positive angle.

Figure 14:
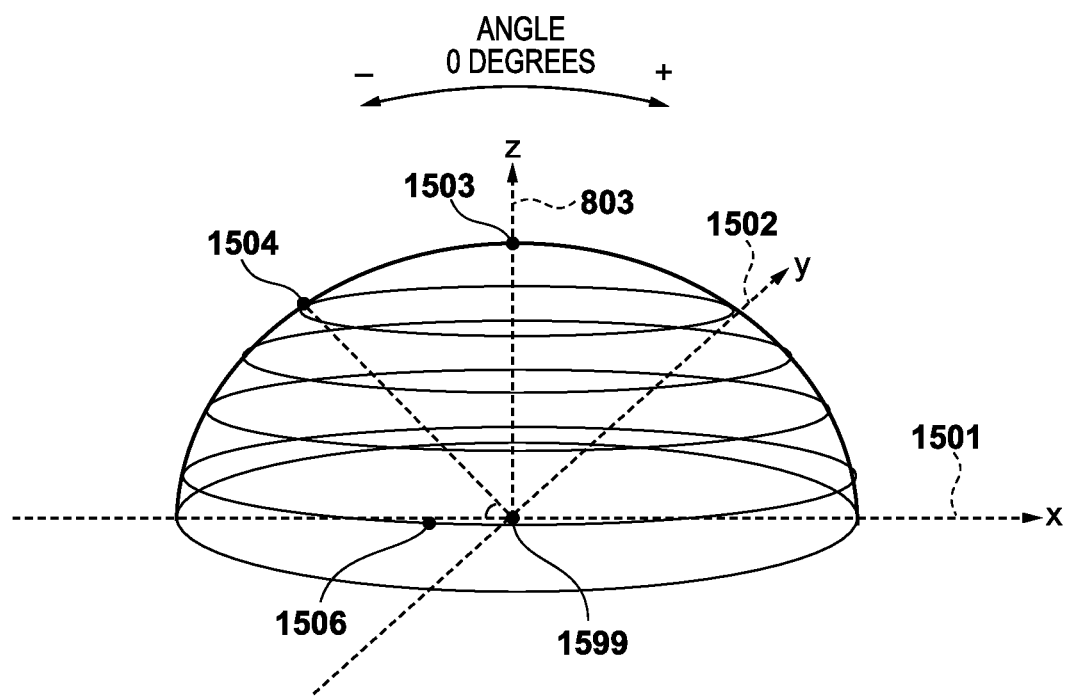
FIG. 14 is a diagram for explaining processing in step S704.

Here, FIG. 8 shows the correction amounts corresponding to the angles formed with the Z-axis (normal vector 803) in XZ plane. However, in practice, as illustrated in FIG. 14, correction amounts according to the angles formed between the vectors from the LED element at a position 1599 to various positions on the hemisphere centered on the center 1599 and the normal vector 803 are necessary.

In this hemisphere, the point that a line towards to the image capturing apparatus 100 which straight-on faces the LED element at the position 1599 passes through, that is, the point at which the angle is 0 degrees, is a point 1503. In this hemisphere, the normal vector 803 is the center, and the left half is represented by negative angles, and the right half is represented by positive angles. For example, a point on the hemisphere where the angle is "−30 degrees" on the arc (referred to as a basic arc) where Y=0 is a point 30 degrees to the left side from the normal vector 803, and thus is a point 1504. The table in FIG. 8 is a table registering correction amounts corresponding to each point in the basic arc where the angle formed with the normal vector 803 is −80 degrees, −60 degrees, −45 degrees, −30 degrees, −0 degrees, 30 degrees, −45 degrees, −60 degrees, and 80 degrees.

In order to prepare correction amounts corresponding to angles formed between vectors from the position 1599 to various positions on the hemisphere and the normal vector 803, correction amounts corresponding to "respective points at which the angles formed with the normal vector 803 are −80 degrees, −60 degrees, −45 degrees, −30 degrees, 0 degrees, 30 degrees, 45 degrees, 60 degrees, and 80 degrees" on the basic arc when the basic arc is rotated by Δ degrees, 2Δ degrees, . . . , 180 degrees about the Z-axis respectively are obtained by interpolation processing. For example, the correction amount corresponding to a point 1506 (the point at which the angle formed by the normal vector 803 in the arc where X=0 in the hemisphere is "−80 degrees") is the mean of a correction amount CA1 corresponding to the point at which the angle formed with the normal vector 803 in the basic arc is "−80 degrees" and a correction amount CA2 corresponding to the point at which the angle formed by the normal vector 803 in the basic arc is "80 degrees".

A correction amount CD corresponding to the "point at which the angle formed with the normal vector 803 is −80 degrees" on the rotated basic arc obtained by rotating the basic arc S degrees around the Z-axis can be obtained, for example, by using the following equation (3).

$$CD=(180-S)\times CA/180+S\times CB/180 \quad (3)$$

By performing such a calculation for S=Δ degrees, 2Δ degrees, . . . , 180 degrees, it is possible to obtain a correction amount corresponding to a "point at which the angle formed with the normal vector 803 is −80 degrees" for each of Δ degrees, 2Δ degrees, . . . , and 180 degrees. Such calculation is performed for "a point at which the angle formed with the normal vector 803 is 0 degrees" (θ=−80 degrees, −60 degrees, −45 degrees, −30 degrees, 0 degrees, 30 degrees, 45 degrees, 60 degrees, and 80 degrees).

Through such a process, the second calculation unit 223 obtains, as the reference information, the correction amounts corresponding to the angles (θXZ, θXY) formed between the vectors from the position 1599 of an LED element to the various positions on the hemisphere and the normal vector 803.

In the present embodiment, a table in which correction amounts corresponding to respective angles of −80 degrees, −60 degrees, −45 degrees, −30 degrees, 0 degrees, 30 degrees, 45 degrees, 60 degrees, and 80 degrees are registered is used, but the number of angles registered is not limited to a specific number. For example, a table in which correction amounts corresponding to more angles are registered may be used.

Further, although processing of obtaining correction amounts according to various angles from the table of FIG. 8 is performed in the present embodiment, such processing may be performed in advance to obtain the correction amounts according to various angles, and the correction amounts may be registered in the holding unit 201 as data.

The second calculation unit 223 refers to the reference information, and obtains the correction amounts of the luminance values corresponding to the angles obtained in step S703 for the respective the LED elements (pixels) in the correction region. When the reference information is generated using the table of FIG. 8, correction amounts cannot be obtained for an angle of greater than 80 degrees. Therefore, for the LED elements (pixels) having an angle obtained in step S703 of 80 degrees or more, the correction amount corresponding to 80 degrees is obtained. Further, when an angle obtained in step S703 is not registered in the reference information, an interpolation correction amount obtained by interpolating from the correction amount corresponding to an angle closest to the angle obtained in step S703 among the angles registered in the reference information is obtained as the correction amount corresponding to the angle obtained in step S703.

Further, in the present embodiment, the LED wall has been described as having LED elements having an R element, a G element, and a B element, but in addition to this, a white LED (W) or LED elements of another color or the like may be included. In such a case, in addition to the correction amounts for R, G, and B, correction amounts corresponding to LED elements of other colors needs to be obtained.

Next, in step S705, the second calculation unit 223 performs a correction process for reducing an effect caused by individual differences in the luminances of each of the display panel 302 and the display panel 303 regarding the correction amounts obtained in step S704. Even with the same video signal, the brightness of the output video of an LED panel may differ due to manufacturing variations in the accuracy of the components or the like. Therefore, in the present embodiment, correction coefficients are registered in the holding unit 201 for each of R, G, and B as individual difference information for correcting an individual difference regarding the luminance of the LED elements for each of the display panel 302 and the display panel 303. An example of individual difference information is illustrated in FIG. 9.

As illustrated in FIG. 9, in the individual difference information, for each of the display panel 302 and the display panel 303, the position (panel position) in the shared coordinate system of the display panel, the correction amount for R (correction amount R), the correction amount for G (correction amount G), and the correction amount for B (correction amount B) are registered.

The second calculation unit 223 multiplies the correction amounts for each of R, G, and B obtained in step S704 for the LED elements (pixels) belonging to the display panel 302 in the correction region by the correction amount R, the correction amount G, and the correction amount B corresponding to the position of the display panel 302 indicated by the arrangement information, and thereby corrects the correction amounts. Similarly, the second calculation unit 223 multiplies the correction amounts for each of R, G, and B obtained in step S704 for the LED elements (pixels) belonging to the display panel 303 in the correction region by the correction amount R, the correction amount G, and the correction amount B corresponding to the position of the display panel 303 indicated by the arrangement information, and thereby corrects the correction amounts.

Then, in step S706, the second calculation unit 223 outputs the "correction amounts of the respective LED elements (pixels) in the correction region" corrected in step S705 to the generation unit 203.

Next, the operation of the display apparatus 300 after it has obtained the display information and the correction amount from the image processing apparatus 200 will be described. The control unit 301 obtains a luminance value obtained by multiplying the luminance value of each pixel in the correction region in the display information obtained from the image processing apparatus 200 by the correction amount obtained from the image processing apparatus 200 for the pixel as the luminance value of the pixel.

For example, it is assumed that a pixel P having the coordinates (a, b) in the correction region is a pixel in the display panel 302, that the luminance values (R, G, B) of the pixel P=(100, 100, 150), and that the correction amounts obtained in step S704 for the pixel P are (1.12, 1.11, and 1.19). Based on the individual difference information in FIG. 9, since the panel position of the display panel 302 is (1, 1), the correction amount R, the correction amount G, and the correction amount B corresponding to the panel position (1, 1) are 1.01, 1.02, and 1.01, respectively.

In this case, the control unit 301, from the image processing apparatus 200, obtains, as the correction amount for R for the pixel P, the correction amount "1.1312" obtained by multiplying the correction amount "1.12" for R obtained in step S704 for the pixel P by the correction amount R "1.01".

Similarly, the control unit 301, from the image processing apparatus 200, obtains, as the correction amount for G for the pixel P, the correction amount "1.1322" obtained by multiplying the correction amount "1.11" for G obtained in step S704 for the pixel P by the correction amount G "1.02".

Similarly, the control unit 301, from the image processing apparatus 200, obtains, as the correction amount for B for the pixel P, the correction amount "1.2019" obtained by multiplying the correction amount "1.19" for B obtained in step S704 for the pixel P by the correction amount B "1.01".

Then, the control unit 301 obtains a value "113" (rounded to the nearest whole number) obtained by multiplying the luminance value "100" of R of the pixel P by the correction amount "1.1312" for R of the pixel P as the luminance value of R after correction of the pixel P.

Similarly, the control unit 301 obtains a value "113" (rounded to the nearest whole number) obtained by multiplying the luminance value "100" of R of the pixel P by the correction amount "1.1322" for R of the pixel P as the luminance value of R after correction of the pixel P.

Similarly, the control unit 301 obtains a value "180" (rounded to the nearest whole number) obtained by multiplying the luminance value "150" of B of the pixel P by the correction amount "1.2019" for B of the pixel P as the luminance value of B after correction of the pixel P.

Then, the control unit 301 performs light emission control of the LED element such that the R element included in the LED element corresponding to the pixel P emits light with a luminance corresponding to the luminance value "113", the G element included in the LED element corresponding to the pixel P emits light with a luminance corresponding to the luminance value "113", and the B element included in the LED element corresponding to the pixel P emits light with a luminance corresponding to the luminance value "180".

As described above, in the present embodiment, it is possible to obtain captured images of an LED wall having a constant brightness within an angle of view range of an image capturing apparatus, regardless of the relative positional relationship between the image capturing apparatus and the LED wall and variation in brightnesses in the respective LED panels in the LED wall.

In the present embodiment, the image processing apparatus 200 outputs the display information and the correction amounts to the display apparatus 300, and the display apparatus 300 causes the LED elements to emit light based on the luminance values obtained by correcting the luminance values of the display information in accordance with the correction amounts. However, the image processing apparatus 200 may perform luminance value correction using the display information and the correction amounts, and output the corrected luminance values to the display apparatus 300. In such a case, the display apparatus 300 controls the emission of light of the LED elements in accordance with the luminance values obtained from the image processing apparatus 200.

Further, in the present embodiment, a case has been described in which a correction amount corresponding to the angle of each LED element (pixel) is obtained using reference information, and the correction amounts are outputted to the display apparatus 300 as the display information.

However, such reference information may be stored in a memory apparatus such as an HDD 405 or an external storage apparatus 409, or may be transmitted to an external apparatus via a network I/F 412. With such a configuration, in order to obtain the correction amounts corresponding to the angles of the respective the LED elements (pixels) from the next time onward, it is sufficient to obtain and use the reference information stored in the memory apparatus or an external apparatus. In addition, configuration may also be taken such that reference information generated by an external apparatus is obtained, stored in the HDD 405, and read out for use as needed.

Second Embodiment

Figure 10:
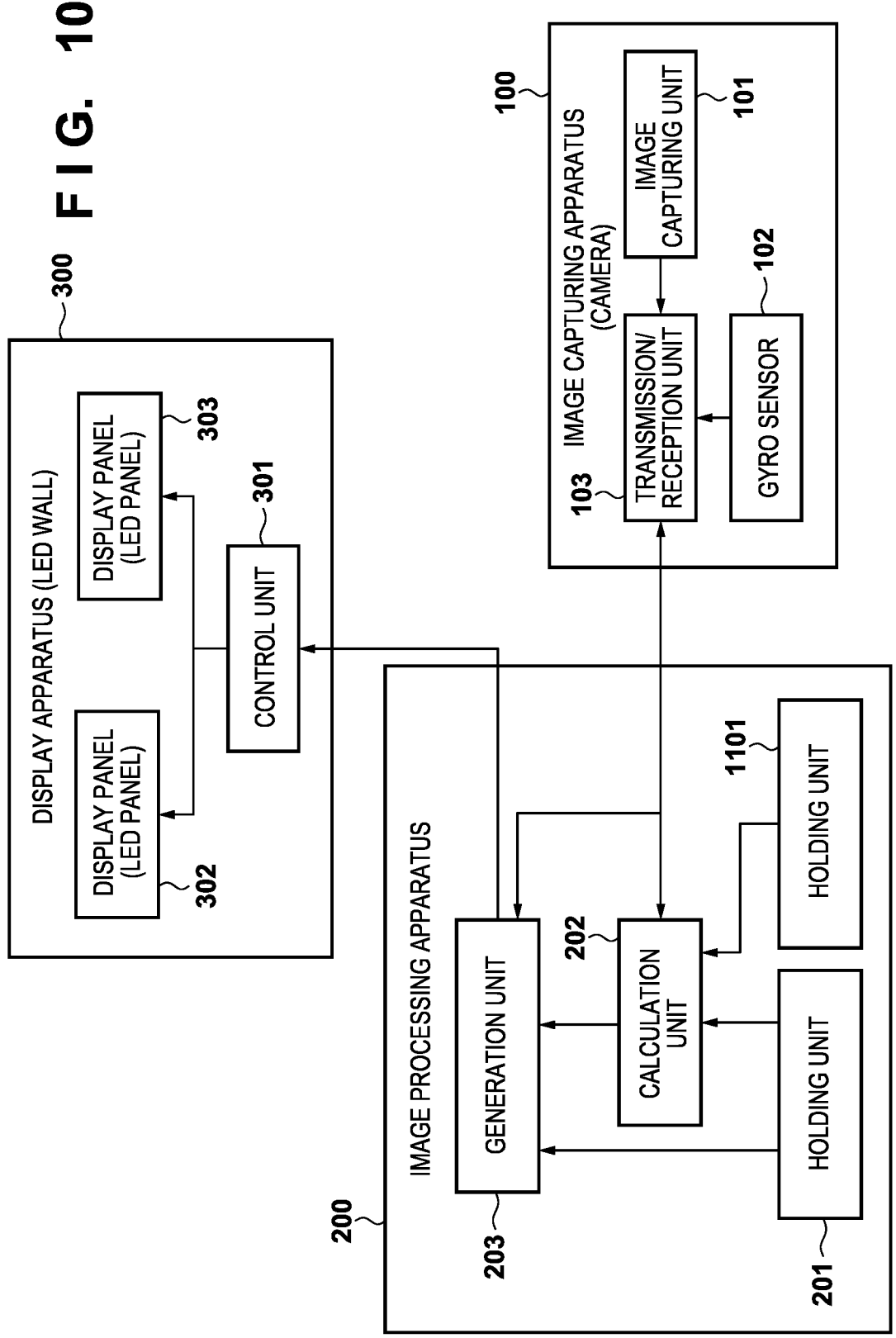
FIG. 10 is a block diagram illustrating a configuration example of a system.

Hereinafter, differences from the first embodiment will be described, and unless otherwise mentioned specifically, the following embodiment is similar to the first embodiment. A configuration example of the system according to the present embodiment is illustrated in a block diagram of FIG. 10. In the configuration illustrated in FIG. 10, the image processing apparatus 200 takes a configuration that includes a holding unit 1101 in the system illustrated in FIG. 1.

Figure 11:
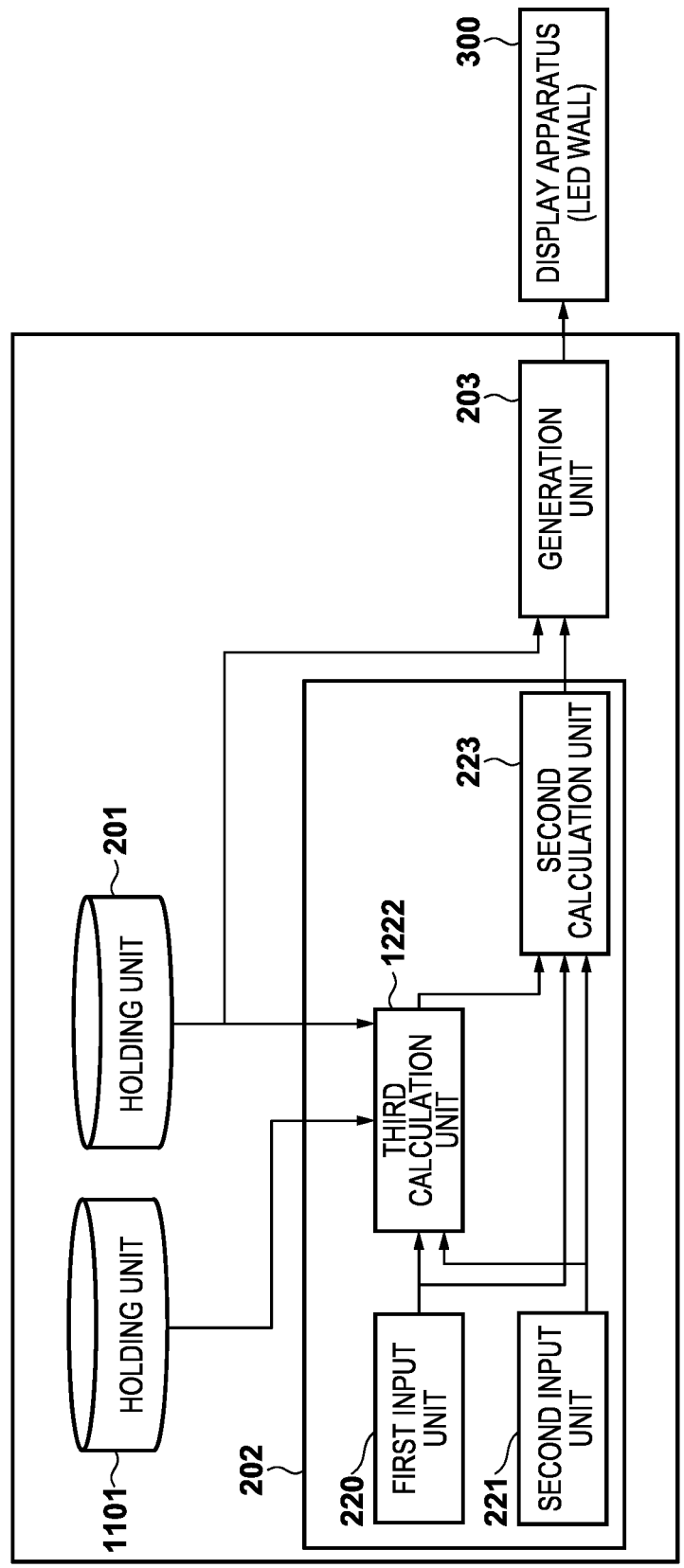
FIG. 11 is a block diagram illustrating a more detailed functional configuration example of the image processing apparatus 200.

A more detailed functional configuration example of the image processing apparatus 200 is illustrated in a block diagram of FIG. 11. In the configuration illustrated in FIG. 11, the holding unit 1101 is added and a third calculation unit 1222 is provided instead of the first calculation unit 222 in the configuration illustrated in FIG. 3. The third calculation unit 1222 performs the processing described above as the processing performed by the first calculation unit 222, and obtains peripheral light loss information for the correction region.

Figure 12:
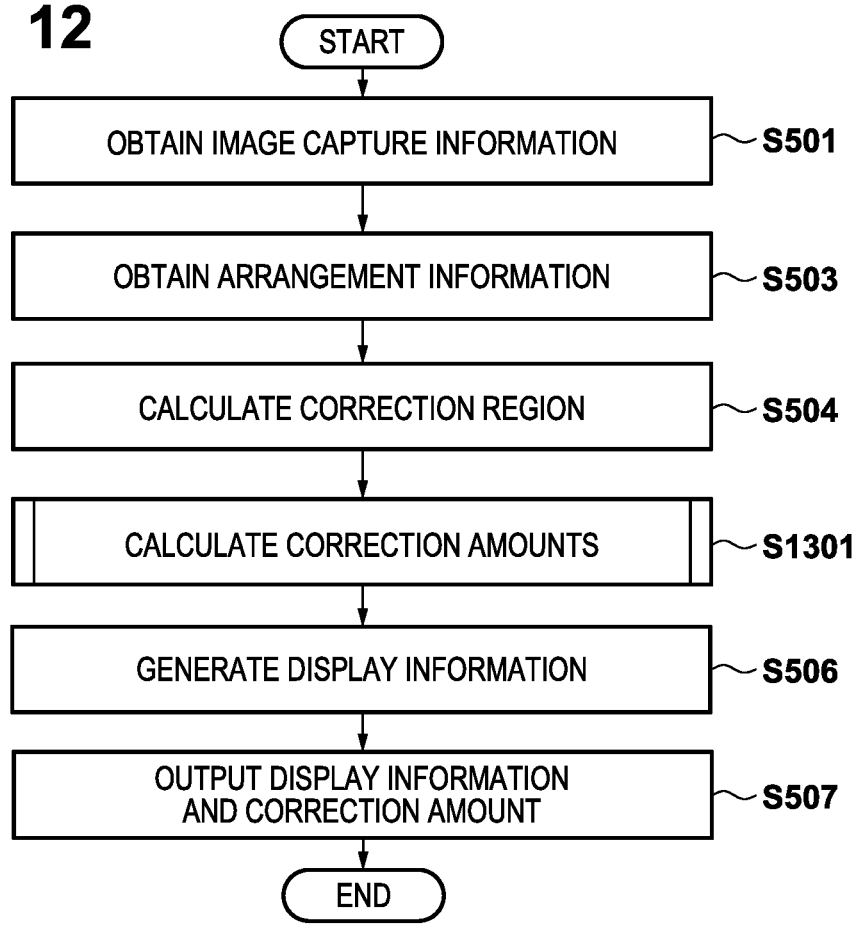
FIG. 12 is a flowchart of a process performed by the image processing apparatus 200 to display display information on an LED wall.

Next, a description will be given in accordance with the flowchart of FIG. 12 in regards to processing performed by the image processing apparatus 200 to display display information on an LED wall. In FIG. 12, processing steps that are similar to those illustrated in FIG. 4 are denoted by the same step numbers, and the description of these processing steps is omitted. In the present embodiment, the processing of step S503 and step S504 is performed by the third calculation unit 1222.

In step S1301, the third calculation unit 1222 obtains "peripheral light loss information indicating peripheral light loss with respect to the lens" stored in the holding unit 1211. The peripheral light loss information is information for correcting peripheral light loss with respect to the lens attached to the image capturing apparatus 100, and is, for example, a map that holds "a correction coefficient for correcting the peripheral light loss" for each pixel of an image captured by the image capturing apparatus 100.

Here, the peripheral light loss information will be described. The peripheral light loss correction information is a map of correction coefficients for correcting peripheral light loss in which the brightness falls the further away from the center of the angle of view it is in an image captured by the image capturing apparatus 100.

The third calculation unit 1222 maps the peripheral light loss information to the correction region, and obtains a correction coefficient corresponding to each pixel in the correction region. The "correction coefficient corresponding to each pixel in the correction region" is the "peripheral light loss information of the correction region".

When the peripheral light loss information is mapped to the correction region, there is a possibility of the occurrence of a location for which no correction coefficient exists in the peripheral light loss information after the mapping, and therefore, a correction coefficient interpolated by a well-known interpolation technique using peripheral correction coefficients may be set for such a location. Note that the method for obtaining the correction coefficient corresponding to each pixel in the correction region is not limited to a specific method.

In addition, the peripheral light loss information is not limited to a map that holds a correction coefficient for each pixel of the image captured by the image capturing apparatus 100, and may be, for example, a calculation formula that can be applied to correct the peripheral light loss of a pixel in the captured image.

Further, the holding unit 1101 may hold peripheral light loss information for each type of lens. In this case, the third calculation unit 1222 obtains "identification information of the lens attached to the image capturing apparatus 100" managed by the image capturing unit 101, and obtains the peripheral light loss information corresponding to the identification information.

Then, the second calculation unit 223 obtains the correction amount obtained by correcting the correction amount for each pixel in the correction region based on the individual difference information similarly to in the first embodiment. Then, the second calculation unit 223 obtains a correction amount obtained by correcting the corrected correction amount based on the correction coefficient obtained by the third calculation unit 1222.

Figure 13:
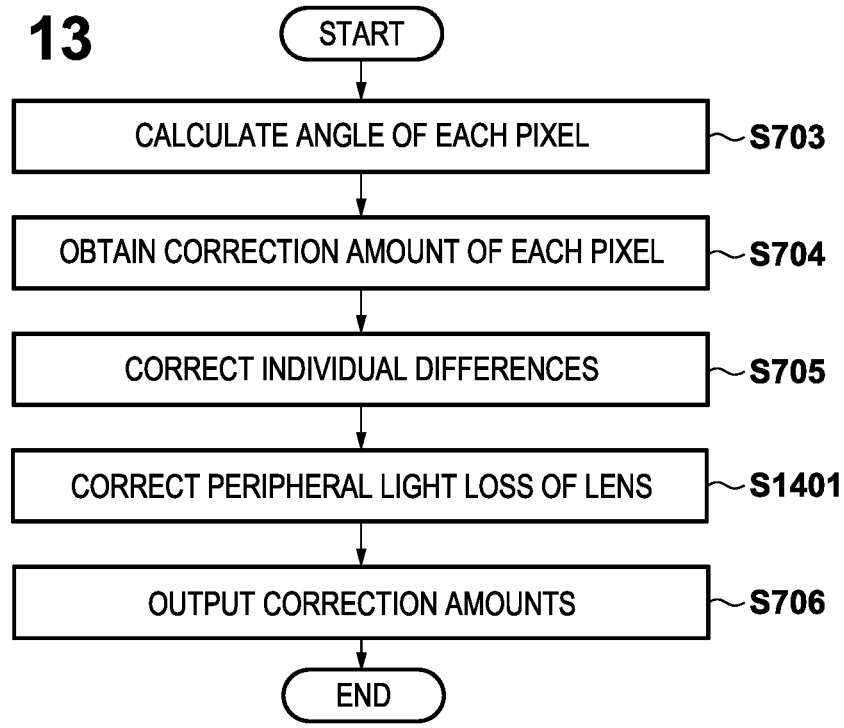
FIG. 13 is a flowchart illustrating details of processing in step S1301.

Details of the process in step S1301 will be described in accordance with the flowchart of FIG. 13. In FIG. 13, processing steps that are similar to those illustrated in FIG. 6 are denoted by the same step numbers, and the description of this processing is omitted.

In step S1401, the third calculation unit 1222 obtains a correction coefficient corresponding to each pixel in the correction region. Then, the second calculation unit 223 multiplies the correction amount for each pixel corrected in step S705 by the correction coefficient corresponding to the pixel among the correction coefficients in the correction region, and obtains the corrected correction amount. In step S706, the second calculation unit 223 outputs the "correction amounts of the respective pixels in the correction region" corrected in step S1401 to the generation unit 203.

As described above, in the present embodiment, it is possible to obtain captured images of an LED wall having a constant brightness within an angle of view range of an image capturing apparatus and for which a peripheral light loss of a lens is corrected, regardless of the relative positional relationship between the image capturing apparatus and the LED wall and the variation in brightnesses in the respective LED panels in the LED wall.

Third Embodiment

In the first embodiment and the second embodiment, the individual difference information is created in advance and registered in the holding unit 201. However, it is also possible to measure individual differences regarding luminance of the LED elements in each of the display panel 302 and the display panel 303 prior to the use of the present system, generate individual difference information based on the results of the measurement, and register the individual difference information in the holding unit 201.

For example, a second generation unit (not illustrated) may be provided in the image processing apparatus 200, and the second generation unit may generate individual difference information using a captured image of "video displayed on the display panel 302" captured by the image capturing apparatus 100 and a captured image of "video displayed on the display panel 303" captured by the image capturing apparatus 100. More specifically, the same test chart is displayed on each of the display panel 302 and the display panel 303. Examples of the test chart include a single-color chart using a signal value that makes the LED panel uniform in color, such as gray, red, green, and blue. The image capturing apparatus 100 then captures an image of the display panel 302 in a position and orientation straight-on facing the center of the screen of the display panel 302 on which the test chart is displayed, and obtains a captured image of the display panel 302. Similarly, the image capturing apparatus 100 captures an image of the display panel 303 in a position and orientation straight-on facing the center of the screen of the display panel 303 on which the test chart is displayed, and obtains a captured image of the display panel 303.

The second generation unit obtains a mean value R1 of the pixel values for R in the image region of the "test chart displayed on the display panel 302" from the captured image of the display panel 302. The second generation unit obtains a mean value R2 of the pixel values for R in the image region of the "test chart displayed on the display panel 303" from the captured image of the display panel 303. Then, the second generation unit obtains the correction amount R of the display panel 302 and the correction amount R of the display panel 303 using R1 and R2, and registers them in the individual difference information. For example, the second generation unit registers R2/R1 as the correction amount R of the display panel 302 and R1/R2 as the correction amount R of the display panel 303 in the individual difference information.

The second generation unit obtains a mean value G1 of the pixel values for G in the image region of the "test chart displayed on the display panel 302" from the captured image of the display panel 302. The second generation unit obtains a mean value G2 of the pixel values for G in the image region of the "test chart displayed on the display panel 303" from the captured image of the display panel 303. Then, the second generation unit obtains the correction amount G of the display panel 302 and the correction amount G of the display panel 303 using G1 and G2, and registers them in the individual difference information. For example, the second generation unit registers G2/G1 as the correction amount G of the display panel 302 and G1/G2 as the correction amount G of the display panel 303 in the individual difference information.

The second generation unit obtains a mean value B1 of the pixel values for B in the image region of the "test chart displayed on the display panel 302" from the captured image of the display panel 302. The second generation unit obtains a mean value B2 of the pixel values for B in the image region of the "test chart displayed on the display panel 303" from the captured image of the display panel 303. Then, the second generation unit obtains the correction amount B of the display panel 302 and the correction amount B of the display panel 303 using B1 and B2, and registers them in the individual difference information. For example, the second generation unit registers B2/B1 as the correction amount B of the display panel 302 and B1/B2 as the correction amount B of the display panel 303 in the individual difference information.

Fourth Embodiment

Each of the functional units of the image processing apparatus 200 illustrated in FIGS. 1, 3, 10, and 11 may be implemented by hardware, and each of the functional units other than the holding units 201 and 1101 may be implemented by software (computer program). In the latter case, a computer apparatus capable of executing such a computer program is applicable to the image processing apparatus 200. An example of a hardware configuration of a computer apparatus applicable to the image processing apparatus 200 will be described with reference to a block diagram of FIG. 2. A personal computer (PC), a workstation (WS), a smart phone, a tablet terminal apparatus, and the like can be applied as the computer apparatus.

A CPU 401 executes various processes using computer programs and data stored in a Random Access Memory (RAM) 402 or a Read Only Memory (ROM) 403. As a result, the CPU 401 controls the operation of the entire computer apparatus and executes or controls various processes described as processes performed by the image processing apparatus 200.

The RAM 402 has an area for storing computer programs and data loaded from the ROM 403, the hard disk drive (HDD) 405, or the external storage apparatus 409. The RAM 402 also has an area for storing various types of information obtained from the image capturing apparatus 100 via the network I/F 412. Further, the RAM 402 has a work area used when the CPU 401 executes various processes. As described above, the RAM 402 appropriately provides various areas.

In addition to the CPU 401 and the RAM 402, the image processing apparatus 200 may be provided with a GPU for rendering display information (for example, CG rendering) to be displayed on the LED wall, and a VRAM for storing data of images and characters (CG data, scene data, and the like).

The ROM 403 stores setting data of the computer apparatus, computer programs and data related to the activation of the computer apparatus, computer programs and data related to the basic operation of the computer apparatus, and the like.

A secondary storage I/F 404 is an interface for connecting the HDD 405 to a system bus 408. The HDD 405 stores an OS (operating system), computer programs and data for causing the CPU 401 to execute or control the various processes described above as the processes performed by the image processing apparatus 200, and the like. Computer programs and data stored in the HDD 405 are processed by the CPU 401 by being loaded into the RAM 402 as appropriate in accordance with control by the CPU 401. In addition to or in place of the HDD 405, various storage devices such as an optical disk drive and a flash memory may be used.

An input I/F 406 is, for example, a serial bus interface such as a USB or IEEE 1394 interface, and is an interface for connecting an input apparatus 411 and the external storage apparatus 409 to the image processing apparatus 200.

The input apparatus 411 is a user interface such as a keyboard, a mouse, and a touch panel, and can input various instructions to the CPU 401 upon operation by the user.

The external storage apparatus 409 is a storage apparatus that can be attached to and detached from the image processing apparatus 200, and is a storage apparatus such as a hard disk drive, a memory card, a CF card, an SD card, or a USB memory. Some or all of the computer programs and data described as being stored in the HDD 405 or the like may be stored in the external storage apparatus 409.

Figure 2:
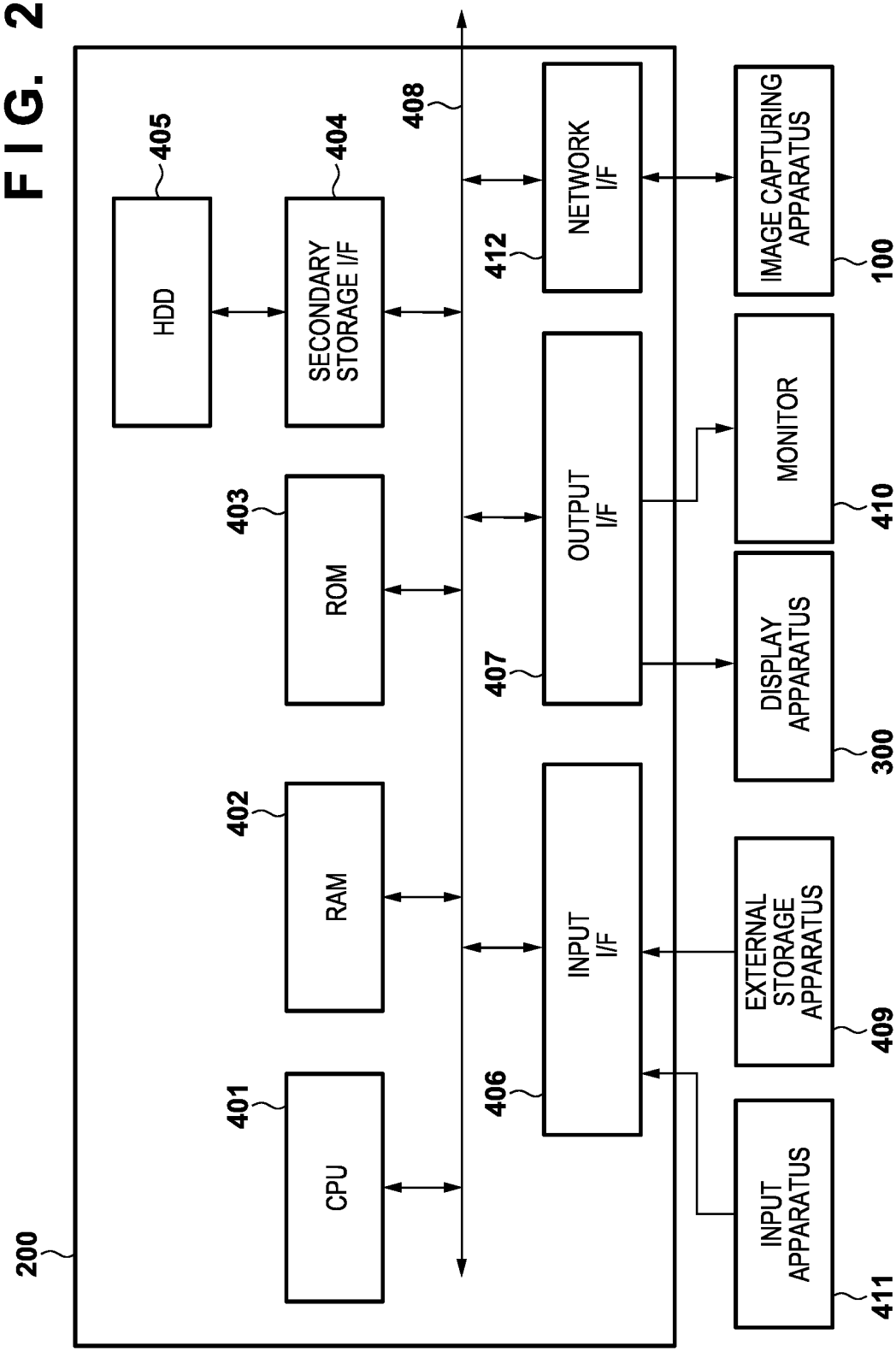
FIG. 2 is a block diagram illustrating an example of a hardware configuration of a computer apparatus applicable to an image processing apparatus 200.

For example, in FIG. 2, the holding unit 201 and the holding unit 1101 can be implemented using one or more memory apparatus among the RAM 402, the ROM 403, the HDD 405 and the external storage apparatus 409.

An output I/F 407, like the input I/F 406, is a serial bus interface such as a USB or IEEE 1394 interface, and is an interface for connecting a monitor 410 and the display apparatus 300 to the image processing apparatus 200. Note that the output I/F 407 may be a video output terminal such as DVI or HDMI (registered trademark).

The monitor 410 is a display apparatus including a liquid crystal screen and a touch panel screen, and displays the results of processing performed by the CPU 401 using images, characters, and the like. For example, the CPU 401 causes the monitor 410 to display data processed by the CPU 401 (for example, the real-time status of the arrangement of the image capturing apparatus 100 and the display apparatus 300).

The network I/F 412 is a connector or the like for connecting to a network such as an Ethernet network, and is an interface for connecting the image capturing apparatus 100 to the image processing apparatus 200.

The CPU 401, the RAM 402, the ROM 403, the secondary storage I/F 404, the input I/F 406, the output I/F 407, and the network I/F 412 are all connected to the system bus 408. Note that the configuration illustrated in FIG. 2 is only one example of a hardware configuration of a computer apparatus applicable to the image processing apparatus 200, and the configuration can be changed/modified as appropriate.

Further, the numerical values, processing timings, processing orders, agents of processing, data (information) obtainment methods/transmission destinations/transmission sources/storage locations, and the like used in the above-described embodiments are given only as examples for the purpose of concrete explanation, and the disclosure is not intended to be limited to such examples.

Also, a part or all of the embodiments described above may be combined as appropriate. Furthermore, a part or all of the embodiments described above may be selectively used.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-118872, filed Jul. 26, 2022, which is hereby incorporated by reference herein in its entirety.

What is claimed is:

1. An image processing apparatus, comprising:
one or more processors; and
one or more memories containing instructions that, when executed by the one or more processors, cause the one or more processors to function as:
a specification unit configured to, based on a parameter of an image capturing apparatus, specify a region captured by the image capturing apparatus in a display screen in which display panels are arrayed, and
a correction unit configured to calculate an angle formed by a vector from a pixel in the region to the image capturing apparatus and a normal vector of the display screen, obtain a correction amount corresponding to the angle as a correction amount of a luminance value of the pixel, and correct the correction amount by multiplying a correction coefficient for correcting an individual difference regarding a luminance of a display panel with the correction amount of the luminance value of the pixel.

2. The image processing apparatus according to claim 1, wherein the specification unit, based on the parameter of the image capturing apparatus, specifies a region included in an angle of view range of the image capturing apparatus in the display screen.

3. The image processing apparatus according to claim 1, wherein
the correction unit corrects the correction amount by multiplying the correction amount with a correction coefficient for correcting an individual difference regarding a luminance of a display panel and a correction coefficient for correcting a peripheral light loss of a lens.

4. The image processing apparatus according to claim 1, wherein the instructions
further cause the one or more processors to function as
an output unit configured to output, to a display unit that provides the display screen, display information to be displayed on the display screen and the correction amount corrected by the correction unit.

5. The image processing apparatus according to claim 1, wherein the instructions further cause the one or more processors to function as
a generation unit configured to generate the information, based on a pixel value of an image region of a test chart in a captured image of a test chart displayed on each display panel.

6. The image processing apparatus according to claim 1, wherein the display panel is a Light Emitting Diode (LED) panel, and the pixel is an Light Emitting Diode (LED) element in the LED panel.

7. An image processing method, comprising:
based on a parameter of an image capturing apparatus, specifying a region captured by the image capturing apparatus in a display screen in which display panels are arrayed; and
calculating an angle formed by a vector from a pixel in the region to the image capturing apparatus and a normal vector of the display screen, obtaining a correction amount corresponding to the angle as a correction amount of a luminance value of the pixel, and correcting the correction amount by multiplying a correction coefficient for correcting an individual difference regarding a luminance of a display panel with the correction amount of the luminance value of the pixel.

8. A non-transitory computer-readable storage medium storing a computer program for causing a computer to function as:

a specification unit configured to, based on a parameter of an image capturing apparatus, specify a region captured by the image capturing apparatus in a display screen in which display panels are arrayed; and a correction unit configured to calculate an angle formed by a vector from a pixel in the region to the image capturing apparatus and a normal vector of the display screen, obtain a correction amount corresponding to the angle as a correction amount of a luminance value of the pixel, and correct the correction amount by multiplying a correction coefficient for correcting an individual difference regarding a luminance of a display panel with the correction amount of the luminance value of the pixel.

\* \* \* \* \*